United States Patent
Kraus et al.

(10) Patent No.: US 8,291,068 B2
(45) Date of Patent: Oct. 16, 2012

(54) AUTOMATIC PROTOCOL DETECTION

(75) Inventors: Moshe Eran Kraus, Mazkeret Batya (IL); Oren Gavriel, Petach Tikva (IL); Adi Regev, Hod Hasharon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 12/320,004

(22) Filed: Jan. 14, 2009

(65) Prior Publication Data

US 2010/0180023 A1     Jul. 15, 2010

(51) Int. Cl.
    *G06F 15/173*     (2006.01)

(52) U.S. Cl. ........ 709/224; 709/236; 709/237; 717/138; 703/15

(58) Field of Classification Search .................. 709/224, 709/237, 236; 702/122; 717/138; 703/15
See application file for complete search history.

(56) References Cited

U.S. PATENT DOCUMENTS

| | | | |
|---|---|---|---|
| 5,953,534 A * | 9/1999 | Romer et al. | 717/138 |
| 6,889,159 B2 * | 5/2005 | Klotz et al. | 702/122 |
| 2003/0208616 A1 * | 11/2003 | Laing et al. | 709/236 |
| 2007/0067450 A1 * | 3/2007 | Malloy et al. | 709/224 |
| 2009/0006066 A1 * | 1/2009 | Behm et al. | 703/15 |
| 2009/0182868 A1 * | 7/2009 | McFate et al. | 709/224 |

\* cited by examiner

*Primary Examiner* — Kyung H Shin

(57) ABSTRACT

A method and corresponding device provides for automatically detecting a protocol for a load testing routine. The method includes the steps of, for an application to be load tested, executing the application and recording communications between a first tier and a second tier during the execution. The recording step includes recording modules loaded by the application, recording network traffic and Web traffic, comparing the recorded modules, network traffic and Web traffic to a rule set, and based on the comparing step, selecting one or more protocols appropriate for load testing the application. Finally, the method includes the step of generating a script based on the recorded communications and the protocols, where the script specifies the protocols.

19 Claims, 5 Drawing Sheets

---

HP VIRTUAL USER GENERATOR - [ADVISOR RESULT1]

FILE  VIEW  TOOLS  WINDOW  HELP

START PAGE | ADVISOR RESULTS

LOADRUNNER - VIRTUAL USER GENERATOR

300

PROTOCOL ADVISOR

APPLICATION NAME: C:\PROGRAM FILES\INTERNET EXPLORER\IEXPLORE.EXE
URL ADDRESS: WWW.CNN.COM

WE DETECTED THE FOLLOWING PROTOCOLS IN YOUR BUSINESS PROCESS:
- AJAX (CLICK AND SCRIPT)
- WEB (HTTP/HTML)

READ MORE...

DONE

AUTOMATIC PROTOCOL DETECTION

BACKGROUND

Load testing of applications that facilitate client-server interaction, for example, require that multiple instances of the applications be executed simultaneously, or near-simultaneously, and that certain performance metrics be measured and the resulting measurements collected, processed, and analyzed. Executing a sufficient number of instances of the application to correctly simulate an actual use-case may be difficult. Moreover, the quality of the test results may depend on the protocols chosen by the test engineer when executing the application load test. FIG. 1 illustrates a current load testing protocol selection interface 10. In essence, the interface 10 merely presents, in a scrollable window, a listing of available protocol selections. The interface 10 does not present any information as to which protocol selections are most appropriate for a given application, and does not provide any assistance to the test engineer in selecting one or more protocols. Because there are many possible protocols available for any specific application, selection of the correct protocol(s) may be time consuming and difficult.

DESCRIPTION OF THE DRAWINGS

The detailed description will refer to the following figures in which the numerals refer to like items, and in which.

DETAILED DESCRIPTION

Disclosed herein is a method, and a corresponding device, that provides for automatically detecting a protocol for a load testing routine. The method includes the steps of, for an application to be load tested, executing the application and recording communications between a first tier and a second tier during the execution. The recording step includes recording modules loaded by the application, recording network traffic, and Web traffic, comparing the recorded modules, network traffic and Web traffic to a rule set, and based on the comparing step, selecting one or more protocols appropriate for load testing the application. Finally, the method includes the step of generating a script based on the recorded communications and the protocols, where the script specifies the protocols.

Figure 2:
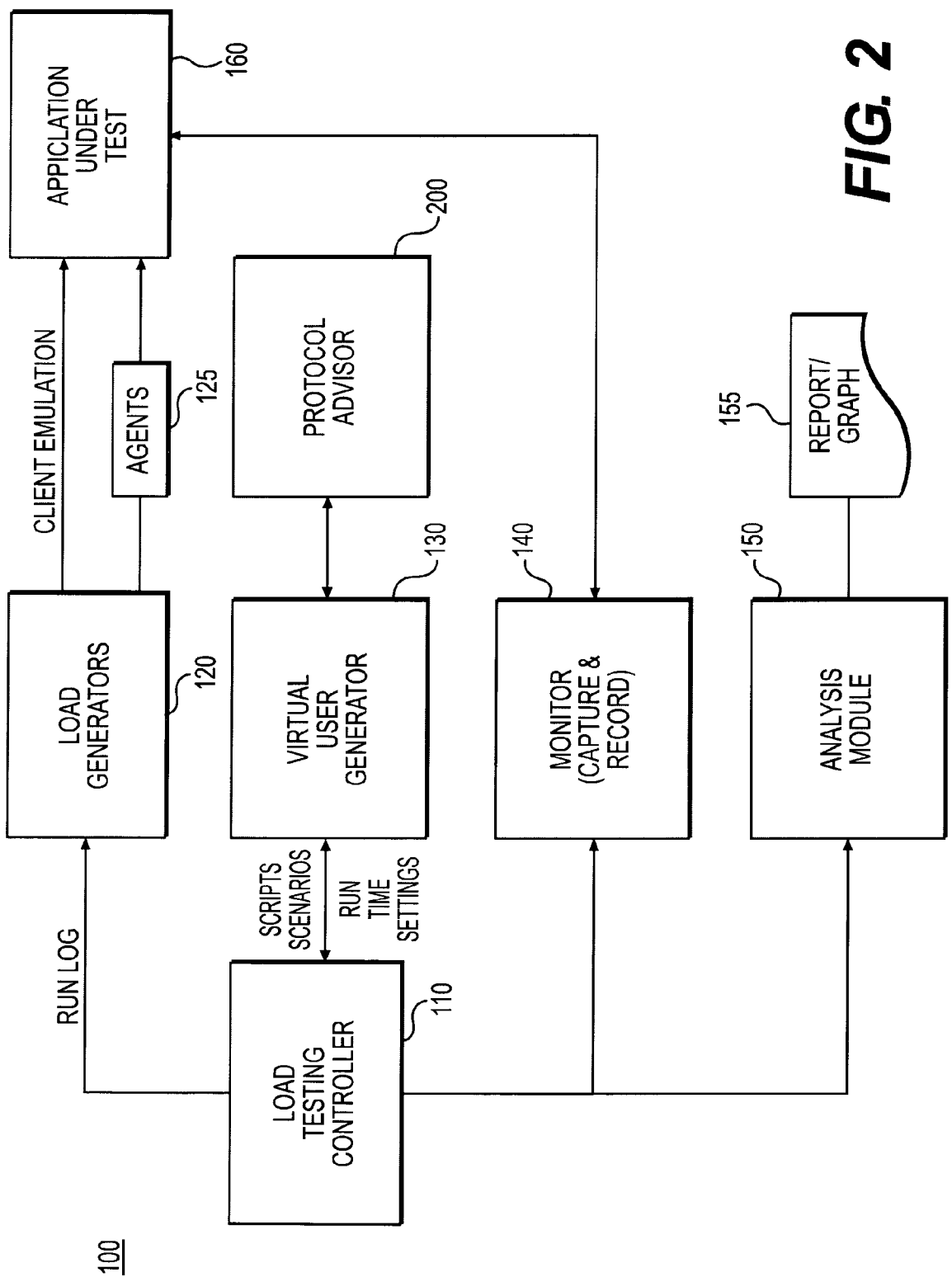
FIG. 2 is a block diagram of a load testing program showing an exemplary automatic load test protocol detection program.

Load testing is a tool by which applications, which may have to support hundreds or thousands of simultaneous instances, can be tested in a way that simulates that actual loading. FIG. 2 illustrates a load test program 100 that is based on the concept of recording client/server activity of an application under test and simulating load use-cases by "replaying" the application to a server as if the test of the application were an actual in-use case. Normally running many client application instances simultaneously requires extensive resources for creating a viable load test scenario. The herein described load test program 100 allows the running of light-weight "virtual users" (Vusers) in such a way that the server cannot distinguish between the Vusers and the real application. A load test protocol is the means for recording (script generation) and replaying (script editing and repetition) mechanisms tailored to a specific environment and technology.

Load test program 100 is a performance and load testing product for examining system behavior and performance while generating an actual load. The load test program 100 can emulate hundreds or thousands of concurrent users to put an application through the rigors of real-life user loads, while collecting information from the key infrastructure components (Web servers, database servers, etc.). The results then can be analyzed in detail, to explore reasons for particular observed behavior.

Consider the client-side application for an automated teller machine (ATM). Although each client is connected to a server, in total there may be hundreds of ATMs open to the public. There may be some peak times—such as 10 am Monday, the start of a work week—during which the load is much higher than at other times. In order to test such situations, it is not practical to have a test bed of hundreds of ATMs. Instead, given an ATM simulator and a computer system with the load test program 100, one can simulate a large number of users accessing the server simultaneously. Once activities have been defined, they are repeatable. For example, after debugging a problem in an application, managers can check whether the problem persists by reproducing the same situation with the same type of user interaction.

The load test program 100 includes a Virtual User Generator (VuGen) 130, Load Testing Controller 110, Load Generators 120, Monitor 140, Analysis Module 150, and protocol advisor 200. The Load Generators dispatch agents 125 to applications/servers under test 160. The Analysis Module 150 produces reports/graphs 155 related to the load testing. The load test program 100 executes to perform the basic steps of reading and recording an application, generating a script based in part on recorded information, and playing back the script to constitute the actual load test.

The load test program 100 creates virtual users that take the place of real users operating client software, such as Internet Explorer sending requests using the HTTP protocol to IIS or Apache Web servers, for example. The Load Generators 120 are used by the load test program 100 to generate requests that constitute the load test being administered by the load test program 100. The Load Generators 120 comprise the agents 125 that are distributed among various machines 160, and these agents 125 are started and stopped by the Load Testing Controller 110. The Controller 110 controls load testing based on "scenarios" invoking compiled "scripts" and associated "run-time settings." Scripts are written by application testers using the Virtual User Generator (VuGen) 130. The VuGen 130 generates C-language scripts to be executed by the virtual users by capturing network traffic between clients and servers. The script issues non-GUI API calls using the same protocols as the applications under test 160. During load testing runs, the status of each application 160 is monitored by the Monitor 140. At the end of each load test run, the Monitor 140 combines its monitoring logs with logs obtained from the Load Generators 120, and makes the combined result available to an Analysis Module 150, which then creates run result graphs and reports 155.

The VuGen 130 allows a user, or test person, to record and/or script a test to be performed against an application under test 160, and enables the user to play back and make modifications to the script as needed. Such modifications may include parameterization (selecting data for keyword-driven testing), correlation, and error handling.

Applications under test 160 are placed under stress by driver processes such as mdrv.exe (the multi-threaded driver process) and r3vuser.exe, which emulate application clients such as Internet Explorer web browser. The driver processes use a cci (C pre-compiling), which creates a file with ci file, and execute using the driver for the protocol and technology being tested.

Virtual users (Vusers) are invoked as groups (logical collection of virtual users running the same script on a specific load generator 120) by agents 125 running as a service or a process on the Load Generators 120. Each application 160 hosting agents 125 maintains an execution log in a .qtp file. When logging is enabled, the agent 125 also creates within a results folder a sequential log file for each Vuser (segregated by Vuser group). During execution, this file is displayed by the Load Testing Controller 110. After a pre-set delay, the Controller 110 instructs the agents 125 to initiate the test session scenarios. The Controller (wlrun.exe) 110 sends a copy of scenario files along with the request. The agents 125 are launched by a remote agent dispatcher process on each Load Generator 120. Each agent 125 refers to scenario (.lrs) definition files to determine which Vuser groups and scripts to run on the applications 160.

The actions to be taken by each Vuser are defined in Vu scripts created using the VuGen 130. When invoked, this program stores in a Windows folder a comparamui.ini file to save under "[LastTablesUsed]" a history of files and [Param-DialogDates] specified using menu option Insert>New Parameter>Dates. The VuGen 130 stores and retrieves a vugen.ini file.

During a run, execution results are stored to a results folder. Errors are written to the output.mdb MS Access database. Within each results folder, a log folder is automatically created to contain a log file for each group. After a run, to view a log file from within the Controller 110 can be viewed by the test person. As a scenario is run, monitors maintain counters locally on each application 160. After a run, a collate process takes .eve and .lrr result files and creates in the results folder as a temporary .mdb (MS-Access) database.

The Analysis Module 150 generates analysis graphs and reports using data from the .mdb database. The results file from each scenario run is read by the Analysis Module 150 to display percentile graphs.

The load test program 100 is applicable to many different applications, and, accordingly, supports many different protocols, including Web HTML/HTTP, Remote Terminal Emulator, Oracle, and Web Services. As used by the load test program 100, a protocol is a communications medium that exists between a client and a server. For example, an AS400 or mainframe-based application uses the Remote Terminal Emulator (RTE) protocol to communicate with a server, and an online banking application uses the HTML protocol with some Java and Web Services protocols. Note that the load test program 100 is capable of recording scripts in both single and multiple protocol modes. Table 1 provides additional examples of protocols available for use with the load test program 100.

TABLE 1

| Called Service | Protocol |
| --- | --- |
| Custom/General | C [WebJS]; visual Basic; VBscript type scripts; Javascript Vuser; java |
| E-Business Web Resource | Http/HTML; SSL; Web Services; FTP |
| Operating [System Resource] | Microsoft (Memory, Network, System, NTDS, Objects, Paging, Disk, Queue, Processor, Thread); Windows DHCP/IAS; UNIX; SNMP |
| [Network] | Winsock Proxy |
| [Firewalls] | CheckPoint Firewall-1 |
| [Web Server Resource] | Apache, MS-IIS |
| [Web Application Server] | Ariba, ATG Dynamo |

During recording, the VuGen 130 records a test's actions by routing data through a proxy. The type of proxy depends upon the protocol being used, and affects the form of the returning script. For some protocols, various recording modes can be selected to further refine the form of the resulting script. For instance, there are two types of recording modes used in the load test program 100 Web/HTTP testing: URL-based and HTML-based.

Correlation is a method used by the load test program 100 to handle dynamic content. Examples of dynamic content include ticket numbers in an online reservation application and transaction id in an online banking application. Dynamic content is so named because the page components are dynamically created during every execution of the business process and always differ from the value generated in previous runs. These dynamic content are a part of the server response. The load test program 100 usually identifies dynamic content on the basis of left and right boundaries and ordinal identifiers.

Once a script is prepared in the VuGen 130, the script is run using the Controller 110. The load test program 100 provides for the use of various "machines" to act as the Load Generators 130. These "machines" are referred to as Load Generators because the actual load is generated from them. Each run is configured with a scenario, which describes which scripts will run, when the scripts will run, how many virtual users will run, and which Load Generators 130 will be used for each script. The test connects each script in the scenario to the name of the "machine" that acts as a Load Generator, and sets the number of virtual users to be from each of the Load Generators.

Figure 1:
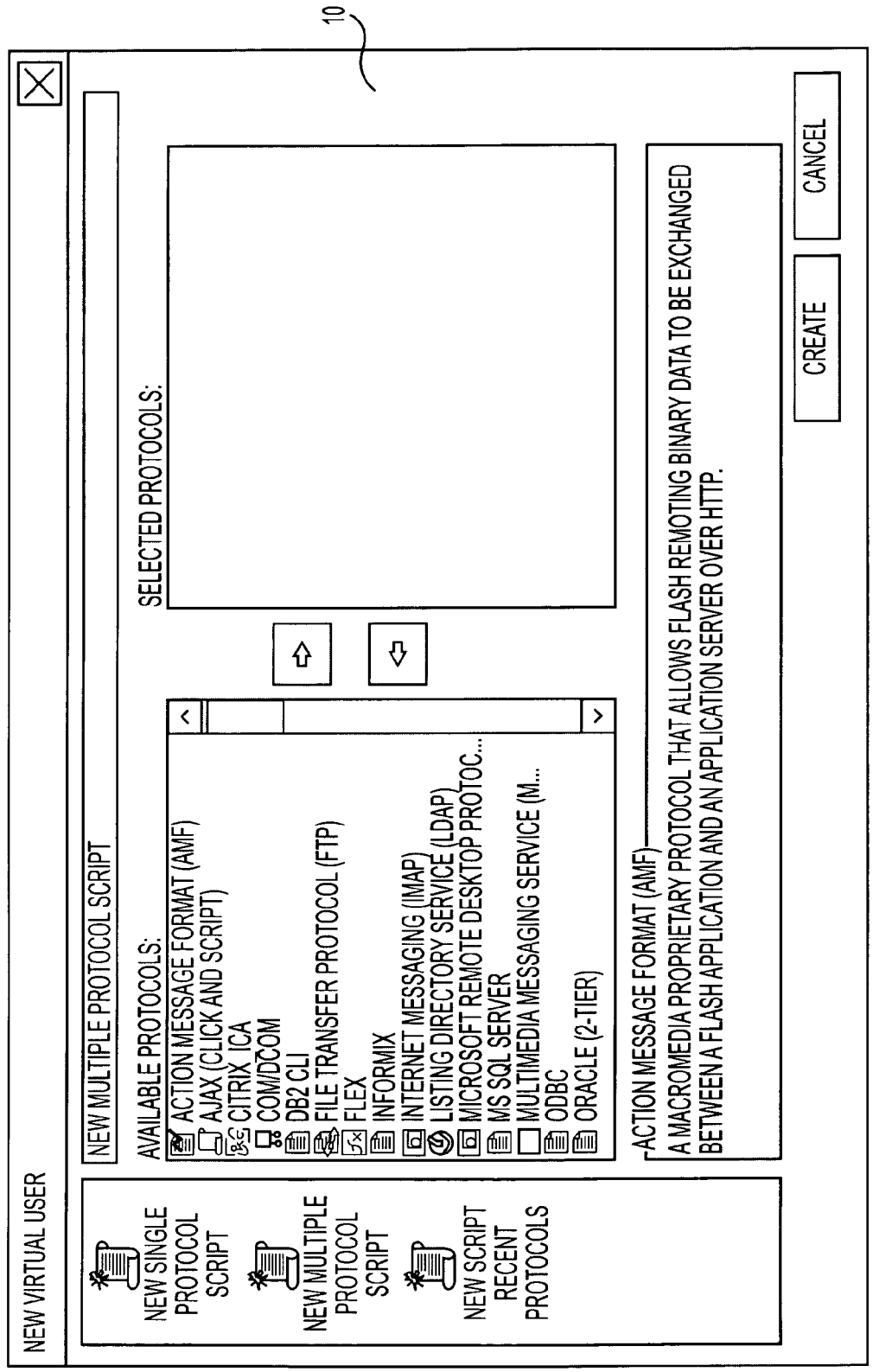
FIG. 1 illustrates a current load test protocol selection interface for use in a load testing program.

One exemplary load testing program is Hewlett-Packard Company's LoadRunner application. LoadRunner currently supports more than 70 protocols and the number of protocols is growing. As explained above, FIG. 1 shows a prior art protocol selection dialog in the LoadRunner. Using this prior art selection methodology could lead to cases in which customers would have difficulty selecting the best matching protocols for their needs:

A user can be new to a load test program, and selecting an appropriate protocol for a specific scenario may be difficult because of the user's lack of experience.

A system can be given to a performance engineer for testing without that engineer knowing what specific environment or technology (client-server communication) is being used internally.

A system can be complex and composed of several technology combinations such as Web+Citrix+Sockets; and SAPGui (fat SAP client)+SAP Web (Web-based SAP).

Some applications are given to a third party (e.g., consultants) for load testing, and these third parties need to understand the technology in order to give a quick assessment of the load testing costs.

A sales team at a client site may need to demonstrate the load test program using the client's actual applications, and thus must identify the relevant protocols to use on the spot.

To help users determine appropriate protocols, the herein disclosed automatic protocol advisor 200 and corresponding method identify certain characteristics of the application subject to load testing and then apply a set of rules to the identified characteristics in order to select one or more appropriate protocols.

Figure 3:
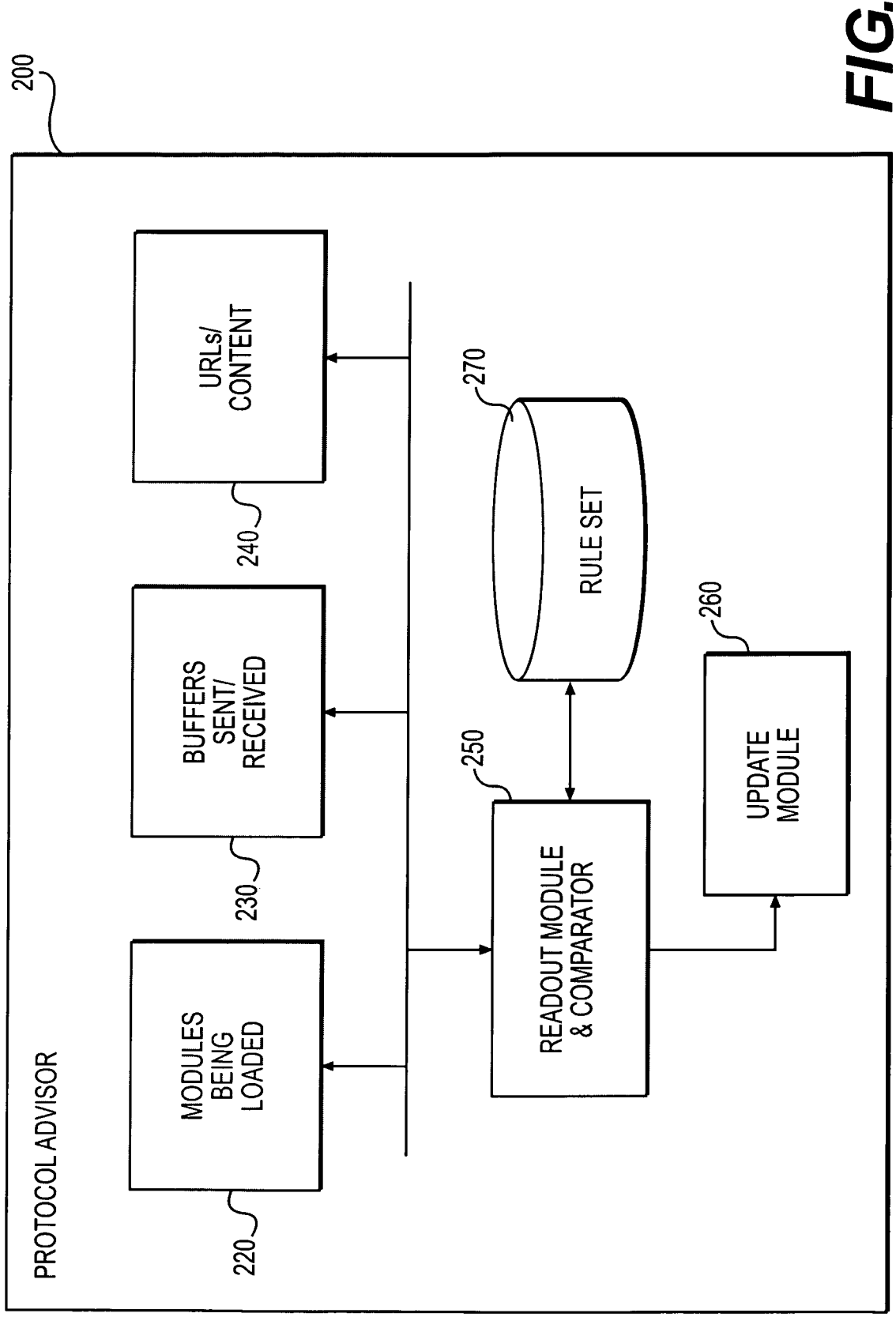
FIG. 3 is a block diagram of selected components of the exemplary automatic load test protocol detection program of FIG. 2.
Figure 4:
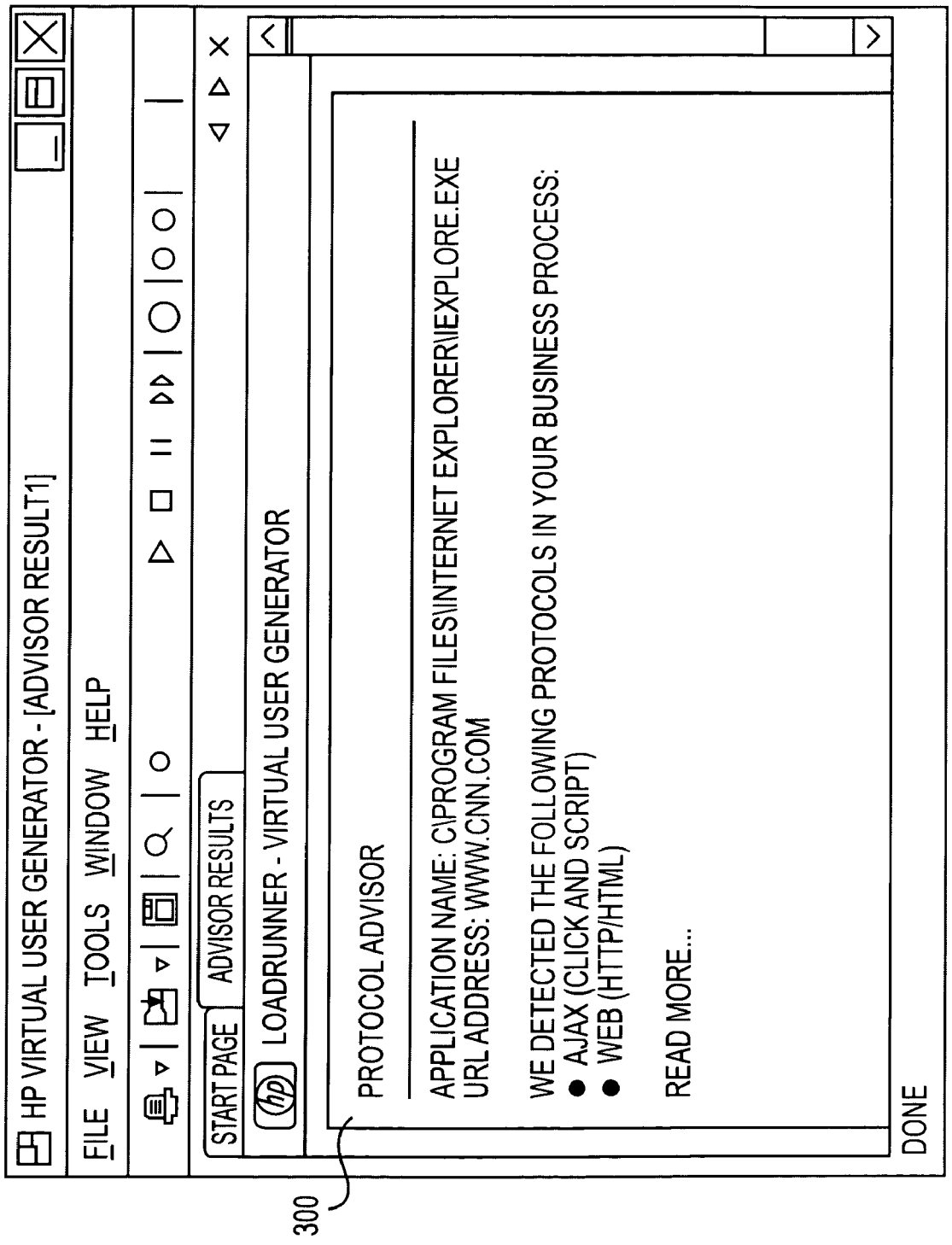
FIG. 4 illustrates an exemplary load test protocol advisor interface generated by the protocol detection program of FIG. 3.

FIG. 3 is a diagram of an exemplary block protocol advisor 200. The protocol advisor 200 may be implemented as a series of routines programmed into a general purpose processor, for example. The protocol advisor 200 includes means for reading and recording certain information and communications between two tiers, such as between a client machine and a server. The client machine may be a computer coupled to a network such as the Internet and the server may be an Internet-based server. The means for reading and recording monitors an executing instance of the application to determine the following characteristics: 1) modules being loaded; 2) network traffic; and 3) Web fine tuning. The means for reading and recording includes module reader 220, buffer reader 230, and Web traffic reader 240. The readers 220, 230, and 240 provide data to comparator module 250, which compares the data to rules stored in rule set 270 and selects one or more protocols appropriate for the application to be load tested. The thus-selected protocols may be displayed to a human user (load tester) by way of user interface 300, shown in FIG. 4. Finally, the protocol advisor 200 may include a rule update module 260, which provides for automatic or manual updating of the rule set 270 as new applications are developed, existing applications updated, or communications mechanisms changed.

In FIG. 3, module reader 220 reads and records the modules being loaded by the application, since such modules are known to require certain protocols. Examples include: SAPGui—the application is saplogone.exe; database protocols use models such as odbc32.dll and db2cli.dll; and Seibel application has several ActiveX objects that are loaded into a browser but have the same unique prefix.

Buffer reader 230 reads network traffic to identify, where possible, signatures of buffers being sent and received, since certain network traffic protocols have distinct buffer signatures. Examples include HTTP, FTP, IMAP, POP3, SMTP, and RDP.

Web traffic reader 250 reads and records HTTP traffic data, including HTTP-based traffic, such as URLs and specific content type. Examples include SAP, Sap high level (aka SAP Click & Script), PeopleSoft, Oracle, and Flex. LoadRunner also offers general Web protocols on a basic level, as well as on a high level for browsers (aka Ajax Click & Script).

The information gathered by components of the protocol advisor 200 is compared to the rule set 270. The rule set 270 includes a number of existing rules, and may be expanded based on future developments. Following is an example rule set for a number of protocols, including protocols, A, B, C:

If the application being recorded is not a.exe, the protocols cannot be protocols A, B, or C. For example, Ajax Click & Script and Web Click & Script can be used only when using IExplorer.exe as the application being recorded.

In a particular module or set of modules is loaded inside the application to be tested, then protocol A can be used. For example, Informix must use the ISQLI710.dll module in order to communicate with the server.

If a particular module starts with a particular expected prefix, the protocol A can be used. For example, Siebel ActiveX objects start with the same prefix but, for different versions, end with a version number or a GUID.

If a HTTP request has a particular pattern in its URL, the appropriate protocol is a specific Web-based protocol. For example, if the URL contains "webdynpro," then the appropriate protocol is SAP Web or SAP Click & Script.

If a HTTP response has a particular content type, the appropriate protocol is a specific Web-based protocol. For example, if the Content-Type header is "application/x-amf," the appropriate protocol is the FLAX protocol.

If protocol A is selected by any role, then deselect protocol B. For example, if the SAP Click & Script protocol is selected, then deselect Ajax Click & Script.

One skilled in the art will recognize that many other rules could be used to populate the rule set 270.

Figure 5:
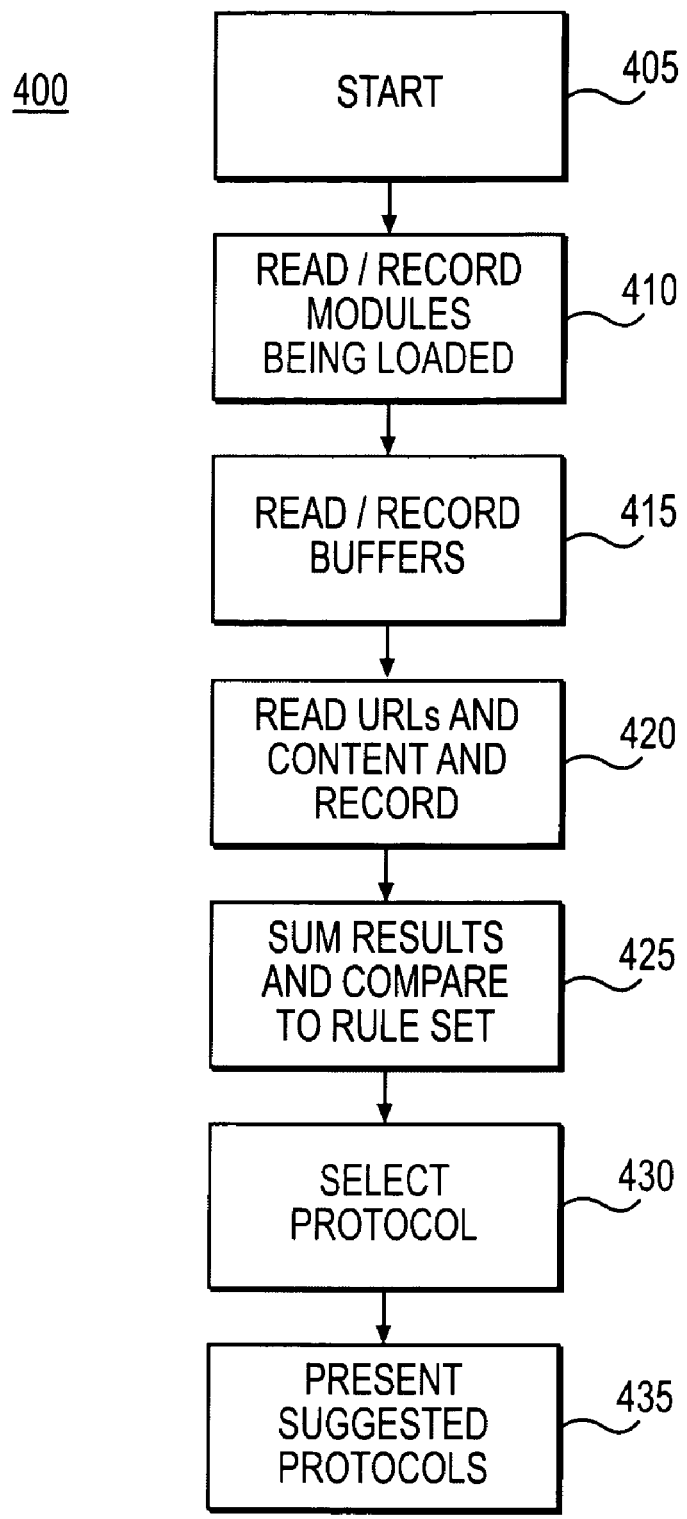
FIG. 5 is a flowchart illustrating an exemplary routine for automatic load test protocol detection in the load testing program of FIG. 2.

FIG. 5 is a flowchart illustrating an exemplary process 400 for automatic protocol detection in a load test program using the test program 100 of FIG. 2 and the protocol advisor 200 of FIG. 3. In FIG. 5, block 405, components of the load test program 100 begin the test program by reading and recording application-related data during an execution of the application under test. In block 410, the program 100 reads any modules being loaded and records this data. In block 415, the program 100 reads any buffers sent or received to identify and distinct signatures that can be linked to a specific protocol. In block 420, the program 100 reads and records URLs and content type. Next, in block 425, the program combines the thus-recorded information and compares the result to the rule set 270. In block 430, the program 100 selects the protocol(s) most appropriate for the application under test 160. In block 435, the program 100 formats and presents the selected protocols to a user for incorporation into a script that will be sued to perform the load test.

In addition to the above-noted information, the load test program 100 may also detect and identify which protocols are being used on which port of the client/server, and how much of the detected traffic is Web-based or generated from .NET components. Finally, the test program 100 provides for dynamic (e.g., through a product patch) updating of the rule set 270 when a new environment/framework is introduced.

The invention claimed is:

1. A method, executed on a suitably programmed processor, for automatically detecting a protocol for a load testing routine, comprising:

executing an application and recording communications between a first tier and a second tier during the execution for determining a number of characteristics of the application, comprising:
recording modules loaded by the application,
recording network traffic including distinct signatures of buffers sent and buffers received, and
recording Web traffic,
comparing the number of characteristics, including the recorded modules, network traffic, distinct signatures, and Web traffic, to a rule set for formatting and presenting a number of protocols to a user for incorporation into a script that will be used to perform the load testing routine;
selecting one or more protocols from the number of protocols appropriate for load testing the application based on the comparing step; and
generating a script based on the recorded communications and the protocols, wherein the script specifies the protocols.

2. The method of claim 1, wherein the comparing step comprises comparing Web traffic to typical urls.

3. The method of claim 2, further comprising comparing Web traffic to a specific content type.

4. The method of claim 3, wherein the Web traffic comprises HTTP traffic.

5. The method of claim 1, wherein recording the modules loaded comprises recording module prefix and suffix information.

6. The method of claim 1, wherein recording communications further comprises:
   recording ports used by the application; and
   recording which protocols are useable on the ports.

7. The method of claim 1, further comprising presenting the selected protocols in a display readable in a user interface.

8. The method of claim 1, wherein the first tier is a client machine and the second tier is a server.

9. The method of claim 8, wherein the server is an Internet-based server, and wherein the application to be load tested provides for interaction between the client machine and the Internet-based server.

10. An automatic protocol advisor, implemented as routines on a processor, for suggesting one or more protocols suitable for execution of an application, comprising:
   reading and recording information related to the application for determining a number of characteristics of the application, comprising:
      a module reader that reads and records modules loaded by the application during execution,
      a buffer reader that reads and records distinct signatures of buffers sent and buffers received during execution, and
      a Web traffic reader that read and records addresses of Web sites accessible by the application;
   comparing the recorded number of characteristics to a rule set for formatting and presenting a number of protocols to a user for incorporation into a script that will be used to perform the load testing routine; and
   selecting one or more protocols from the number of protocols based on the comparison between the recorded information and the rule set.

11. The protocol advisor of claim 10, wherein the module reader records module prefix and suffix information.

12. The protocol advisor of claim 10, wherein the reading and recording means further comprises:
   recording ports used by the application; and
   recording which protocols are useable on the ports.

13. The protocol advisor of claim 10, further comprising a display generator that generates a user interface that presents the suggested protocols.

14. The protocol advisor of claim 10, wherein the application invokes an operation between a first tier and a second tier, wherein the first tier is a client machine and the second tier is a server.

15. The protocol advisor of claim 14, wherein the server is an Internet-based server.

16. A method for load testing an application, comprising:
   loading an application on a client machine;
   initiating execution of the application;
   recording information and communications related to the execution of the application for determining a number of characteristics of the application, comprising:
      recording modules loaded by the application,
      recording network traffic occurring while recording the communications, wherein recording network traffic includes recording distinct signatures of buffers sent and buffers received, and
      recording Web traffic occurring while recording the communications,
   comparing the recorded information and communications to a protocol selection rule set for formatting and presenting a number of protocols to a user for incorporation into a script that will be used to perform the load testing routine;
   suggesting, based on the comparison, one or more protocols from the number of protocols appropriate for the load testing;
   creating a script for the load testing, the script including the protocols; and
   playing back the script, whereby the application is load tested using the one or more protocols.

17. The method of claim 16, wherein the comparing step comprises comparing Web traffic to typical URLs and comparing Web traffic to a specific content type, wherein the Web traffic comprises HTTP traffic.

18. The method of claim 16, wherein recording the modules loaded comprises recording module prefix and suffix information.

19. The method of claim 16, wherein recording information and communications further comprises:
   recording ports used by the application; and
   recording which protocols are useable on the ports.

* * * * *